United States Patent [19]

McKeown

[11] 4,002,705
[45] Jan. 11, 1977

[54] FLUID-FLUID CONTACT APPARATUS

[75] Inventor: Kevin Joseph McKeown, Windermere, England

[73] Assignee: Mass Transfer Limited, Kendal, England

[22] Filed: June 10, 1975

[21] Appl. No.: 585,702

Related U.S. Application Data

[63] Continuation of Ser. No. 336,209, Feb. 27, 1973, abandoned.

[30] Foreign Application Priority Data

Mar. 1, 1972 United Kingdom ............... 9650/72
Apr. 12, 1972 United Kingdom ............ 16971/72

[52] U.S. Cl. .......................... 261/98; 261/DIG. 72
[51] Int. Cl.² .......................................... B01F 3/04
[58] Field of Search ............ 210/150, 151; 261/94, 261/95, 98

[56] References Cited

UNITED STATES PATENTS

| 699,345 | 5/1902 | Provost, Jr. | 210/151 |
| 799,605 | 9/1905 | Lester | 210/151 |
| 936,464 | 10/1909 | Lucas | 210/151 |
| 1,578,687 | 3/1926 | Sperr, Jr. | 261/95 |
| 1,715,252 | 5/1929 | Sperr, Jr. | 261/94 |
| 2,055,162 | 9/1936 | Weber | 261/94 |
| 2,088,497 | 7/1937 | Tijmstra | 261/94 |
| 2,183,657 | 12/1939 | Page | 210/150 |
| 2,212,932 | 8/1940 | Fairlie | 261/94 |
| 2,271,671 | 2/1942 | Wible | 261/94 |
| 3,293,174 | 12/1966 | Robjohns | 210/150 |
| 3,704,869 | 12/1972 | Priestley | 261/112 |
| R27,721 | 8/1973 | Klock | 210/150 |

FOREIGN PATENTS OR APPLICATIONS 538,448 8/1941 United Kingdom ............... 210/150

OTHER PUBLICATIONS

"Tower Packings;" Bulletin TP54; U.S. Stoneware Co.; Akron 9, Ohio; 1957, cover and p. 15 only.

Primary Examiner—Tim R. Miles
Attorney, Agent, or Firm—Wigman & Cohen

[57] ABSTRACT

Gas-liquid contact apparatus comprising a packed bed formed of at least two superimposed layers of fabricated packings including an upper layer of randomly dumped members comprising ribbed tubular elements and a lower layer of stacked packing elements.

4 Claims, 3 Drawing Figures

FLUID-FLUID CONTACT APPARATUS

This is a continuation, of application Ser. No. 336,209 filed Feb. 27, 1973, now abandoned.

This invention is concerned with fluid-fluid contact apparatus of the packed tower type.

Fluid-fluid contact apparatus of the packed tower type for effecting mutual gas/liquid is well known. Basically, such apparatus comprises a tower or other structure containing one or more beds of packing elements and having means for introducing the fluids to be brought into contact with each other into said bed. In many applications, the fluids are brought into contact in countercurrent flow, the more dense fluid (i.e. the liquid) flowing downwardly through the packed bed while the less dense fluid (i.e. the gas) flows upwardly through the bed. It is not necessary that both fluids be forcibly fed to the bed and thus, for example, in the case of a so-called sewage filtration bed, liquid effluent is irrigated onto the surface of a packed bed through which air is allowed to permeate (usually without forced flow) to permit aerobic biological treatment of the effluent.

A wide variety of packing elements are known for such apparatus, for example fabricated packings such as Raschig rings, Berl saddles, Intalox saddles and Pall rings. In the case of packing elements such as Raschig rings or Pall rings the beds may be stacked beds (i.e. beds in which the elements are individually placed in position) or dumped beds (i.e. beds in which at least a portion of the elements have been dumped in situ in the apparatus). In the case of the saddle-type packings, the beds will almost always be "dumped" beds.

In certain applications of fluid-fluid apparatus of the packed tower type especially sewage filtration beds, there is a tendency for the upper part of the bed to become choked with solid material deposited therein as a result of the fluid-fluid contact, i.e. the so-called "bios" in the case of sewage filtration beds. It has now been found, in accordance with the present invention, that this problem may be largely overcome by providing the upper part of the bed with a lower surface area per unit volume than the lower part of the bed.

Broadly, therefore, the present invention consists in gas-liquid contact apparatus comprising a packed bed formed of at least two superimposed layers of fabricated packings in which the upper layer of packing has a lower surface per unit volume than the lower layer(s) of packing; and means for introducing a gas and a liquid into the bed for contact therein. The invention also consists in a method for bringing a gas and a liquid into contact in such an apparatus.

The packing used in the bed may be any of the conventional fabricated packings as referred to above, e.g. Raschig rings, Berl saddles, Intalox saddles or Pall rings. Whilst one or each layer of the bed may be a stacked layer it is often preferred, for reasons of convenience, that they be dumped layers and it is also generally preferred that the fabricated packings be of the ring rather than the saddle type although one may, of course, use different types of packing element for each layer, for example the upper (low surface area) layer may be formed of a ring type element whereas the lower layer may be formed on a saddle-type element, since the latter tend to have a higher surface area per unit volume. Such a packed bed consists of two or more layers of dumped packing elements, the surface area per unit volume of each layer being lower than the layer immediately below it and higher than that immediately above it. In general, each individual layer of dumped packing elements should have a thickness of not less than about one foot for the most satisfactory results and clearly the total depth of each layer will depend upon the total depth of the whole bed and the number of layers.

When one layer of the packed bed is formed of stacked packings it is preferred that this be the lower layer and in this case it has been found that the upper dumped layer need not necessarily have a surface area per unit volume lower than that of the lower stacked layer, i.e. in accordance with this modification of the invention the upper dumped layer of packing may have the same or greater surface area per unit volume than the lower, stacked layer. In accordance with a further modification of the invention it has been found that good results may be obtained using a bed having the dumped/stacked configuration in which a further layer of stacked packing is superimposed in the upper dumped layer to give a "sandwich", stacked/dumped/stacked configuration.

The stacked layer(s) of the bed in the apparatus of the invention may be formed of such fabricated packing elements as Raschig rings or Pall rings but, in accordance with a preferred feature of the invention, is formed of an array of generally vertical tubes especially an array of tubes as described in G.B. Patent No. 1286244 namely an array of tubes formed by assembling together one or more packing sheets comprising a number of spaced parallel portions each of which is shaped as a sector of a hollow corrugated tube, of which the peaks and valleys of the corrugations occur successively along the length of the tube, the said portions being connected by substantially planar portions of said sheets. Such tubes are packed or stacked with their longitudinal axes extending vertically upwards and the stacked layer may comprise two or more layers of such tubes, in which case the separated sub-layers of the stacked layers may be separated by perforated sheets (for example of expanded metal or plastics). Similarly, the dumped layer of the bed in the apparatus in the invention may be separated from the stacked layer by means of a gas and liquid pervious sheet and different dumped layers may also be so separated.

The apparatus of the invention having the dumped/stacked or stacked/dumped/stacked configuration will give a generally better liquid distribution over the surface of the lower stacked layer than would otherwise be the case and, further, there will be an increased liquid residence time within the bed.

The dumped layer(s) of packing in the apparatus of the invention may be dumped layer(s) of conventional fabricated packings such as Raschig rings, Berl saddles, Intalox saddles or Pall rings. In accordance with a preferred embodiment of the invention, however, the dumped layer(s) are formed of packing elements as described in co-pending application No. 209969, filed Dec. 20, 1971, which is assigned to the assignee of this invention. That application was abandoned in favor of continuation application Ser. No. 445,961, now U.S. Pat. No. 3,957,931. Such packing elements comprise an open-ended tubular member, the maximum transverse dimension of which is a plane perpendicular to its length (its "diameter") is greater than the length of a right tube having the same cross-section as the tubular member and having the same surface area as the projected surface of the tubular member of a coaxial right tube of the same cross-section (its "width"). A very wide variety of packing elements are described in application Ser. No. 209969, and a particularly preferred form of packing element, for use, for example, in sewage filtration beds, is one of the type illustrated in FIG. 22 of the drawings accompanying that Application, namely a packing element having a diameter greater than its width, preferably having a diameter to width ratio greater than 1.5:1, and having a plurality of inwardly directed ribs which meet at a hub which extends beyond the plane of the ends of the tubular member.

Where the upper layer of packing elements has a lower surface area (i.e. an increased void space) as compared with the lower layers of packing elements, this may be achieved, in the case of packing elements having the same design, by using packing elements having larger overall dimensions for the upper layer. Alternatively, the above result may be achieved by using packing elements of different design in each layer and thus, for example, the higher surface area packing elements may be provided with more protrusions, ribs, etc.

Low surface area per unit volume forms of dumped packings for use in the apparatus of the invention may suitably have a surface area per unit volume of from 25 to 45 preferably from 30 to 40, especially about 35 square feet per cubic foot whilst high surface area per unit volume forms of dumped packing may suitably have a surface area per unit volume 50 to 65, preferably from 50 to 65, especially about 55 square feet per cubic foot. Low surface area per unit volume forms of stacked packing may suitably have a surface area per unit volume of from 20 to 40, preferably from 25 to 35, especially about 30 square feet per cubic foot, whilst high surface area per unit volume forms of stacked packing may suitably have a surface area per unit volume of 45 to 60, preferably from 45 to 55, especially about 50 square feet per cubic foot.

DETAILED DESCRIPTION OF THE PREFERRED EMBODIMENT

Figure 1:
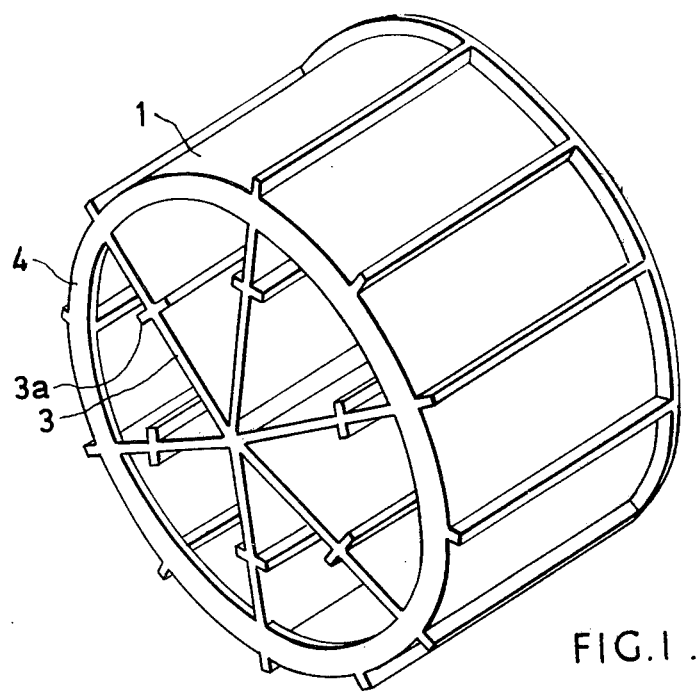
FIG. 1 is a perspective view of a preferred form of tower packing element to form the dumped layer of the beds of the invention.

The tower packing element shown in FIG. 1 comprises a tubular member 1 having a diameter to width ratio of greater than 1.5:1 and having internal ribs 3 which are in turn provided with sub-ribs 3a, and an internal rim 4.

Figure 2:
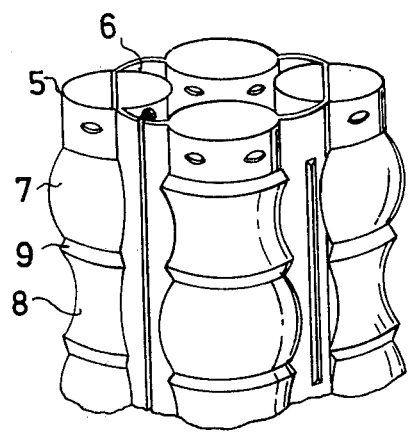
FIG. 2 is a perspective view of a preferred form of tower packing element to form the stacked layer(s) of the beds of the invention.

The tower packing element shown in FIG. 2 of the drawing is formed by folding a pair of sheets 5 and 6 to form an array of four vertical tubes, the walls of which are provided with successive corrugation 7 and 8 and linked by plan portions 9.

Figure 3:
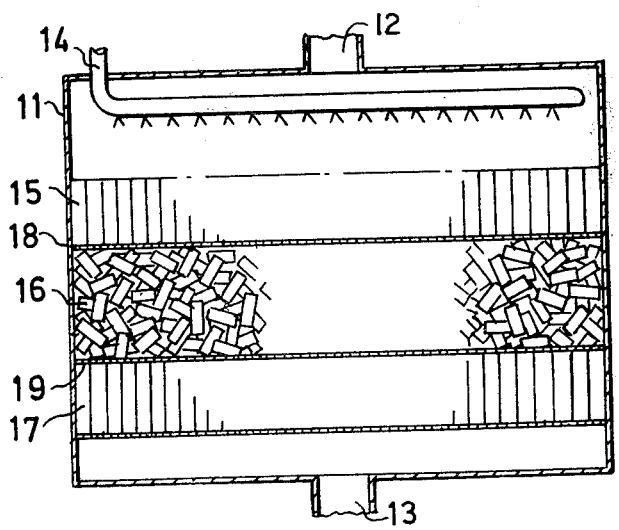
FIG. 3 is a diagrammatic representation of apparatus in accordance with the invention.

The apparatus shown in FIG. 3 of the drawings comprises a container or tower 11 having an inlet duct 13 for the introduction of a gas and an outlet duct 12 for the removal of a gas. The interim of tower 11 contain a bed formed of three layers 15, 16 and 17 of packing elements separated by and supported on grids 18 and 19. The lower layer 17 is formed of stacked tubular elements comprising an array of vertical tubes, as is the upper layer 15. The middle layer 16 is formed of dumped open ended tubular members having a diameter to length ratio of greater than 1.5:1 which are also provided with inwardly directed ribs (not shown). A liquid to be brought into downwards countercurrent contact with a gas introduced via inlet duct 13 and removed via outlet duct 12 so as to flow upwardly through the packed bed formed of layers 15, 16 and 17 is introduced by irrigation means.

The apparatus of the invention may be used for a variety of gas-liquid contact purposes and may for example, be applied to sewage or effluent "filtration" beds. Accordingly, another embodiment of the invention consists in effluent filtration apparatus comprising gas-liquid contact apparatus as defined above and having means for irrigating liquid effluent on to the upper surface of the packed bed and means for allowing air to flow upwardly through the bed.

Further, the apparatus of the invention is particularly suitable for air, or other gas, cooling applications.

The effluent treatment apparatus in accordance with the invention will generally comprise the packed bed contained within retaining walls, which may be, for example, circular or rectangular in plan, the walls at the lower part of the bed being provided with apertures for the removal of treated liquid effluent and the introduction of air into the bed. The means for irrigating the liquid effluent to be treated onto the upper surface of the bed may comprise a system of wiers or the conventional rotating sprinkler arm mechanism which may be driven or may be rotated by reaction from the liquid effluent sprayed therefrom.

The invention also provides a method for the treatment of sewage or other effluent by a biological process which comprises irrigating the sewage onto the surface of a packed bed as defined above, whilst permitting air to circulate or flow upwardly through the said packed bed, and recovering treated liquid effluent from the lower part of the bed.

The liquid effluent irrigated onto the surface of the bed will generally have been conventionally treated, e.g. in a settling tank, before being irrigated onto the bed and the treated liquid effluent from the bed may then, if desired, be subjected to conventional clarification treatment.

The present invention has been especially described with reference to two or three layer-beds but it will, of course, be understood that there may be other layers present in the bed; for example dumped layer(s) of packing may be formed of two or more sub-layers of dumped packings having different physical characteristics, similarly, stacked layer(s) may be formed of sub-layers of stacked material having different physical characteristics.

Whilst it is not essential, in certain embodiments of the present invention, that the upper layer of packing have a lower surface area per unit volume than the lower layer of packing, it is, of course, entirely possible that it may do so. Alternatively, for example, in the case of these embodiments dumped layer(s) and stacked layer(s) may be formed of several sub-layers whose surface area per unit volume increases downwardly through the bed. In those embodiments of the invention where it is required that the upper layer of packings have a lower surface area per unit volume than the lower layer(s) where any layer is formed of a series of sub-layers the surface area per unit volume of these sub-layers should be the same or should increase downwardly through the layer.

I claim:

1. Gas-liquid contact apparatus comprising a packed bed formed of at least two superimposed layers of fabricated packings in which the bed comprises an upper layer of randomly dumped packing members having a surface area per unit volume of 25–45 square feet per cubic feet and comprising tubular elements having a diameter to width ratio greater than 1.5:1, a plurality of ribs extending inwardly from said tubular elements, said randomly dumped packing members being superimposed on a lower layer of stacked packing having a surface area per unit volume of 45–60 square feet per cubic feet; and means for introducing a gas and a liquid into the bed for contact therein.

2. Apparatus according to claim 1 having an additional layer of stacked packing superimposed on said upper, dumped packing layer.

3. Apparatus according to claim 1 in which the stacked packing layer is formed of an array of generally vertical tubes.

4. Apparatus according to claim 1 in which the stacked packing layer is formed of an array of tubes formed by assembling together one or more packing sheets comprising a number of spaced parallel portions each of which is shaped as a sector of a hollow corrugated tube, of which the peaks and valleys of the corrugations occur successively along the length of the tube, the said portions being connected by substantially planar portions of said sheets.

* * * * *